United States Patent
Jang (10) Patent No.: US 11,718,293 B2
(45) Date of Patent: Aug. 8, 2023

(54) DRIVER ASSISTANCE APPARATUS

(71) Applicant: HL Klemove Corp., Pyeongtaek (KR)

(72) Inventor: Sungwoo Jang, Yongin (KR)

(73) Assignee: HL KLEMOVE CORP., Incheon (KR)

(*) Notice: Subject to any disclaimer, the term of this patent is extended or adjusted under 35 U.S.C. 154(b) by 124 days.

(21) Appl. No.: 17/134,685

(22) Filed: Dec. 28, 2020

(65) Prior Publication Data

US 2021/0323545 A1 Oct. 21, 2021

(51) Int. Cl.
*B60W 30/095* (2012.01)
*B60W 60/00* (2020.01)
*B60W 30/09* (2012.01)
*B60W 40/072* (2012.01)
*B60W 50/00* (2006.01)

(52) U.S. Cl.
CPC ...... *B60W 30/0956* (2013.01); *B60W 40/072* (2013.01); *B60W 50/0097* (2013.01); *B60W 30/09* (2013.01); *B60W 60/0015* (2020.02); *B60W 2420/52* (2013.01); *B60W 2552/53* (2020.02); *B60W 2554/4041* (2020.02); *B60W 2554/4042* (2020.02); *B60W 2554/4043* (2020.02); *B60W 2554/4044* (2020.02)

(58) Field of Classification Search
CPC .......... B60W 30/0956; B60W 40/072; B60W 50/0097; B60W 30/09; B60W 60/0015; B60W 2420/52; B60W 2552/53; B60W 2554/4041; B60W 2554/4042; B60W 2554/4043; B60W 2554/4044; B60W 2552/30; B60W 40/04; B60W 40/10; B60W 2520/105; B60W 2520/125; B60R 21/0134; G01S 13/931
See application file for complete search history.

(56) References Cited

U.S. PATENT DOCUMENTS

| | | | |
|---|---|---|---|
| 11,142,196 B2 * | 10/2021 | Huang | B60W 60/00272 |
| 11,333,739 B2 * | 5/2022 | Wodrich | G01S 13/878 |
| 11,537,134 B1 * | 12/2022 | Wiest | G05D 1/0221 |
| 2013/0223686 A1 * | 8/2013 | Shimizu | G08G 1/166 |
| | | | 382/103 |
| 2017/0108863 A1 * | 4/2017 | Chundrlik, Jr | B60W 50/0205 |
| 2019/0061760 A1 * | 2/2019 | Pawlicki | B60T 7/22 |
| 2019/0129003 A1 * | 5/2019 | Longman | G01S 7/35 |
| 2020/0339146 A1 * | 10/2020 | Stangl | G06N 3/044 |
| 2020/0339154 A1 * | 10/2020 | Stangl | B60W 60/001 |
| 2021/0261159 A1 * | 8/2021 | Pazhayampallil | B60W 10/18 |
| 2021/0272018 A1 * | 9/2021 | Casas | G05B 17/02 |
| 2021/0278539 A1 * | 9/2021 | Laddha | G01S 17/58 |
| 2021/0300413 A1 * | 9/2021 | Turlej | B60W 60/0027 |
| 2022/0001895 A1 * | 1/2022 | Inaba | B60W 60/0013 |
| 2022/0122461 A1 * | 4/2022 | Konishi | G01C 21/28 |
| 2022/0185334 A1 * | 6/2022 | Bae | B60W 60/0027 |

* cited by examiner

*Primary Examiner* — Peter D Nolan
*Assistant Examiner* — Anwar Mohamed
(74) *Attorney, Agent, or Firm* — Harvest IP Law, LLP (57) ABSTRACT

In accordance with an aspect of a driver assistance system includes a radar sensor installed in a vehicle, having a side sensing field of view of the vehicle, and configured to acquire side sensing data; and a controller including a processor configured to process the side sensing data; and the controller may be configured to estimate motion state of a moving object at the side of the vehicle based on applying the side sensing data to at least one of a first estimation model and a second estimation model.

20 Claims, 8 Drawing Sheets

DRIVER ASSISTANCE APPARATUS

CROSS-REFERENCE TO RELATED APPLICATION

This application is based on and claims priority under 35 U.S.C. § 119 to Korean Patent Application No. 10-2020-0048020, filed on Apr. 21, 2020 in the Korean Intellectual Property Office, the disclosure of which is incorporated herein by reference.

BACKGROUND

1. Field

The present disclosure relates to a driver assistance apparatus, more specifically, the driver assistance system estimating motion state of a moving object.

2. Description of the Related Art

Recently, there have been development on various types of advanced driver assistance system (ADAS) that are designed to inform a driver of travelling information of a vehicle to prevent an accident from occurring due to driver's carelessness and perform autonomous driving for driver's convenience.

Furthermore, as the level of the autonomous driving system increases, it is essential to estimate the motion state of nearby vehicles. At this time, the processor installed in the vehicle collects data through various sensors to estimate the motion state of the surrounding vehicle and applies it to a specific algorithm model to estimate the motion state of the surrounding vehicle.

However, this fragmentary method has limitations in predicting motion states in various situations.

SUMMARY

An aspect of the disclosure is to provide a driver assistance system with improved motion state estimation performance of a moving object by applying an appropriate estimation model according to the motion characteristics of a moving object.

One aspect provides a driver assistance system which includes a radar sensor installed in a vehicle, having a side sensing field of view of the vehicle, and configured to acquire side sensing data; and a controller including a processor configured to process the side sensing data; and the controller may be configured to estimate motion state of a moving object at the side of the vehicle based on applying the side sensing data to at least one of a first estimation model and a second estimation model.

The controller may be configured to estimate the motion state of the moving object based on at least one of the first estimation model that calculates on a premise that a lateral motion and a longitudinal motion of the moving object are an equivalent acceleration motion, and the second estimation model that calculates on the premise that the moving object is in a curved motion.

The first estimation model may be configured to estimate the motion state of the moving object based on the position of the moving object, the speed of the moving object, and the acceleration of the moving object.

The second estimation model may be configured to estimate the motion state of the moving object based on the position of the moving object, the speed of the moving object, the acceleration of the moving object, curvature of the lane on which the moving object travels, the center line of the lane, and error information of the traveling direction angle of the moving object.

The second estimation model may be configured to estimate the motion state of the moving object by applying the side sensing data of the moving object to a Frenet frame.

The controller may be configured to calculate an expected value of the motion state of the moving object based on Equation 3 below.

$$\hat{x}_j = \sum_{i=1}^{M} \hat{x}_i(k-1 \mid k-1) * \mu_{i|j}(k-1 \mid k-1) \quad \text{[Equation 3]}$$

Here, $\hat{x}_j$ is the expected value of the motion state of the moving object, $\hat{x}_i$ is the estimated value of the previous motion state of the moving object, and $\mu_{1|k}$ is the coupling probability between the first and second estimation models.

The controller may be configured to calculate the coupling probability based on Equation 4 below.

$$\mu_{i|j}(k-1 \mid k-1) = \frac{1}{\bar{c}_j} p_{ij}\mu_i(k-1) \quad \text{[Equation 4]}$$

Here, $\mu_{i|j}$ is the coupling probability between the first and second estimation models, $c_j$ is the normalization coefficient, $\bar{c}_j = \Sigma_{i=1}^{M} p_{ij}\mu_j(k-1)$, $p_{ij}$ is the model transition probability: $p_{ij} = \text{Prob}\{I(\theta_k) = j \mid I(\theta_{k-1}) = i\}$.

The controller may be configured to generate a likelihood function based on equation 5 below.

$$\Lambda_j(k) = \frac{1}{\sqrt{2\pi|S_j(k)|}} \exp\left(-\frac{E_j(k)S_j(k)^{-1}E_j(k)^T}{2}\right) \quad \text{[Equation 5]}$$

Here, $\Lambda_k(k)$ is a likelihood function, $s_j(k)$ is an error covariance between measurement model and measurement value $(s_j(k) = H_j P_j(k|k-1) H_j^T + R_j(k))$, $E_j(k)$ is an error between the estimate from the measurement model and the actual measurement $(E_j(k) = z(k) - \tilde{z}_j(k|k-1))$.

The controller may be configured to calculate a model probability selected from the first estimation model and the second estimation model based on Equation 6 below.

$$\mu_j(k) = \frac{\Lambda_j(k)\bar{c}_j}{\sum_{i=1}^{M} \Lambda_j(k)\bar{c}_j} \quad \text{[Equation 6]}$$

Here, $\bar{c}_j$ the normalization coefficient, $\bar{c}_j = \Sigma_{i=1}^{M} p_{ij}\mu_j(k-1)$, and $\Lambda_j(k)$ is a likelihood function.

The controller may be configured to estimate the motion state of the moving object based on the model probability according to Equation 7.

$$\hat{X}(k \mid k) = \sum_{i=1}^{M} \hat{X}_j(k \mid k)\mu_j(k) \quad \text{[Equation 7]}$$

Here, $\mu_j(k)$ is a model probability, $\hat{X}_j(k|k)$ is an expected value of moving object.

In accordance with another aspect of the present disclosure, a driver assistance method includes acquiring side sensing data; and estimating motion state of a moving object at the side of the vehicle based on applying the side sensing data to at least one of a first estimation model and a second estimation model.

Estimating the motion state of the moving object may include estimating the motion state of the moving object based on at least one of the first estimation model that calculates on a premise that a lateral motion and a longitudinal motion of the moving object are an equivalent acceleration motion, and the second estimation model that calculates on the premise that the moving object is in a curved motion.

The first estimation model may be configured to estimate the motion state of the moving object based on the position of the moving object, the speed of the moving object, and the acceleration of the moving object.

The second estimation model may be configured to estimate the motion state of the moving object based on the position of the moving object, the speed of the moving object, the acceleration of the moving object, curvature of the lane on which the moving object travels, the center line of the lane, and error information of the traveling direction angle of the moving object.

The second estimation model may be configured to estimate the motion state of the moving object by applying the side sensing data of the moving object to a Frenet frame.

Estimating the motion state of the moving object may include calculating an expected value of the motion state of the moving object based on Equation 3 below.

$$\hat{x}_j = \sum_{i=1}^{M} \hat{x}_i(k-1|k-1) * \mu_{i|j}(k-1|k-1) \qquad \text{[Equation 3]}$$

Here, $\hat{x}_j$ is the expected value of the motion state of the moving object $\hat{x}_i$ is the estimated value of the previous motion state of the moving object, and $\mu_{i|j}$ is the coupling probability between the first and second estimation models.

Estimating the motion state of the moving object may include calculating the coupling probability based on Equation 4 below.

$$\mu_{i|j}(k-1|k-1) = \frac{1}{\bar{c}_j} p_{ij}\mu_i(k-1) \qquad \text{[Equation 4]}$$

Here, $\mu_{i|j}$ is the coupling probability between the first and second estimation models, $c_j$ is the normalization coefficient, $\bar{c}_j = \sum_{i=1}^{M} p_{ij}\mu_j(k-1)$, $p_{ij}$ is the model transition probability: $p_{ij} = \text{Prob}\{I(\theta_k) = j | I(\theta_{k-1}) = i\}$.

18. The method of claim 17, wherein estimating the motion state of the moving object includes generating a likelihood function based on equation 5 below.

$$\Lambda_j(k) = \frac{1}{\sqrt{2\pi|S_j(k)|}} \exp\left(-\frac{E_j(k)S_j(k)^{-1}E_j(k)^T}{2}\right) \qquad \text{[Equation 5]}$$

Here, $\Lambda_j(k)$ is a likelihood function.

Estimating the motion state of the moving object may include calculating a model probability selected from the first estimation model and the second estimation model based on Equation 6 below.

$$\mu_j(k) = \frac{\Lambda_j(k)\bar{c}_j}{\sum_{i=1}^{M} \Lambda_j(k)\bar{c}_j} \qquad \text{[Equation 6]}$$

Here, $\bar{c}_j$ is the normalization coefficient, $\bar{c}_j = \sum_{i=1}^{M} p_{ij}\mu_j(k-1)$ and $\Lambda_j(k)$ is a likelihood function.

Estimating the motion state of the moving object may include estimating the motion state of the moving object based on the model probability according to Equation 7.

$$\hat{X}(k|k) = \sum_{i=1}^{M} \hat{X}_j(k|k)\mu_j(k) \qquad \text{[Equation 7]}$$

Here, $\mu_j(k)$ is a model probability, $\tilde{X}_j(k|k)$ is an expected value of moving object.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

Figure 1:
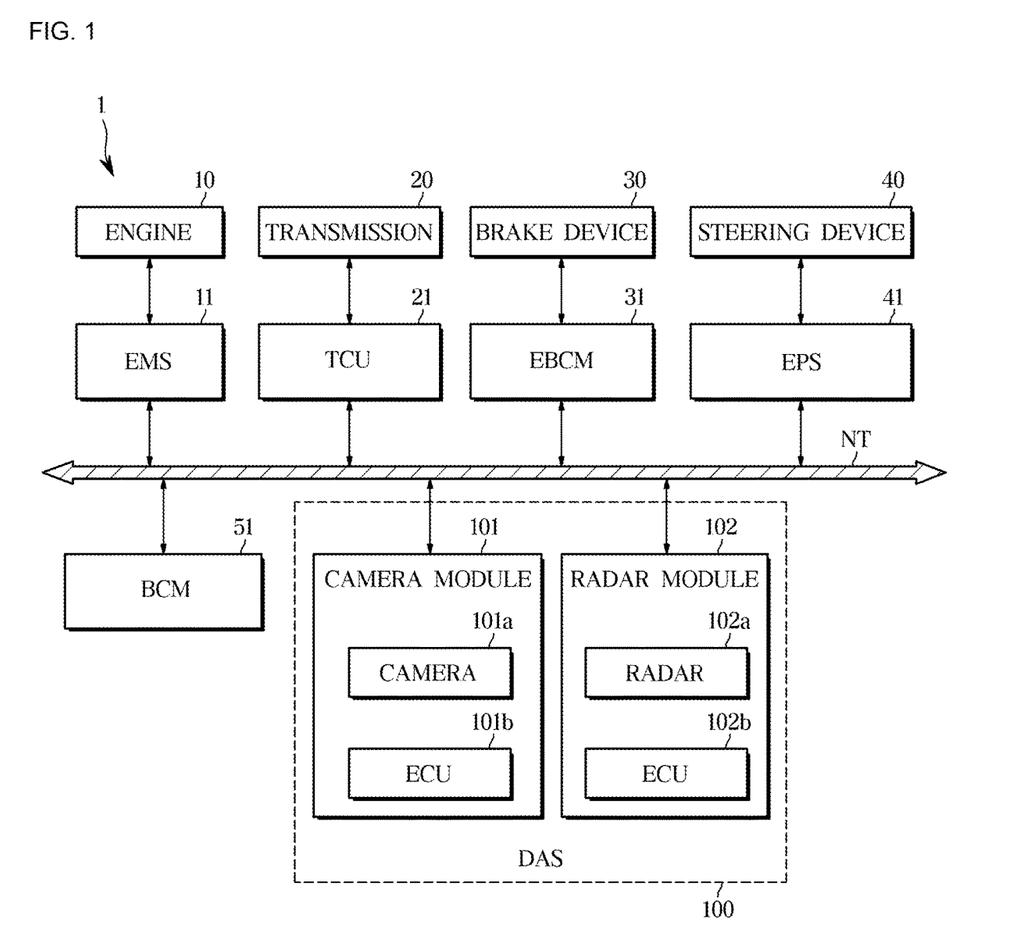
FIG. 1 is a block diagram illustrating a vehicle according to an embodiment.

FIG. 1 is a block diagram illustrating a vehicle according to an embodiment.

Referring to FIG. 1, the vehicle 1 includes an engine 10, a transmission 20, a braking device 30, and a steering device 40. The engine 10 may include a cylinder and a piston, and generate power for the vehicle 1 to travel. The transmission 20 may include a plurality of gears, and transmit power generated by the engine 10 to wheels. The braking device 30 may decelerate the vehicle 1 or stop the vehicle 1 through friction with the wheels. The steering device 40 may change the travelling direction of the vehicle 1.

The vehicle 1 may include a plurality of electrical components. For example, the vehicle 1 further includes an engine management system (EMS) 11, a transmission control unit (TCU) 21, and an electronic brake control module (EBCM) 31), an electronic power steering (EPS) 41, a body control module (BCM), and an advanced driver assistance system (ADAS).

The EMS 11 may control the engine 10 in response to acceleration intent of a driver through an accelerator pedal or a request of an advanced driver assistance system (ADAS) 100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to over-steering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, steering) the vehicle 1. For example, the ADAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The ADAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may include a camera module 101 for acquiring image data around the vehicle 1 and a radar module 102 for acquiring obstacle data around the vehicle 1. The camera module 101 may include a camera 101a and an electronic control unit (ECU) 101b, and may photograph the front of the vehicle 1 and recognize other vehicles, pedestrians, cyclists, lanes, road signs, and the like. The radar module 102 may include a radar 102a and an electronic control unit (ECU) 102b and may acquire relative positions and relative velocities of obstacles (e.g., other vehicles, pedestrians, cyclists, and the like) around the vehicle 1. The ADAS 100 is not limited to that shown in FIG. 1, and may further include a lidar that scans around the vehicle 1 and detects an object.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like. ADAS 100 may transmit a drive control signal, a braking control signal, and a steering control signal to the engine management system 11, the electronic braking control module 31, and the electronic steering control device 41, respectively, through the vehicle communication network NT.

Figure 2:
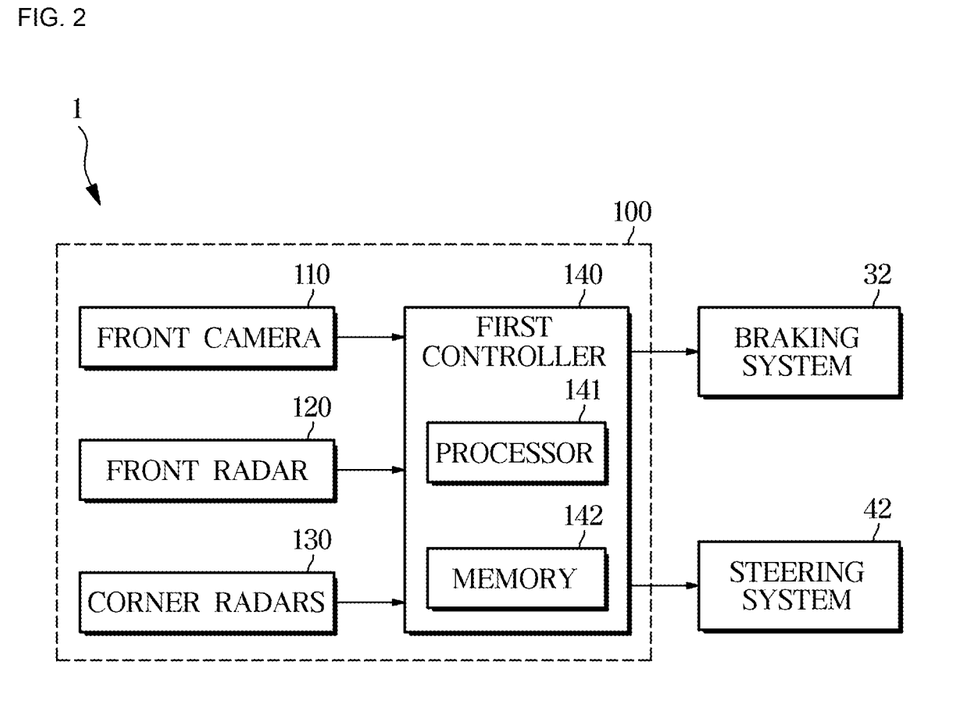
FIG. 2 is a block diagram illustrating an advanced driver assistance system (ADAS) provided in a vehicle according to an embodiment.
Figure 3:
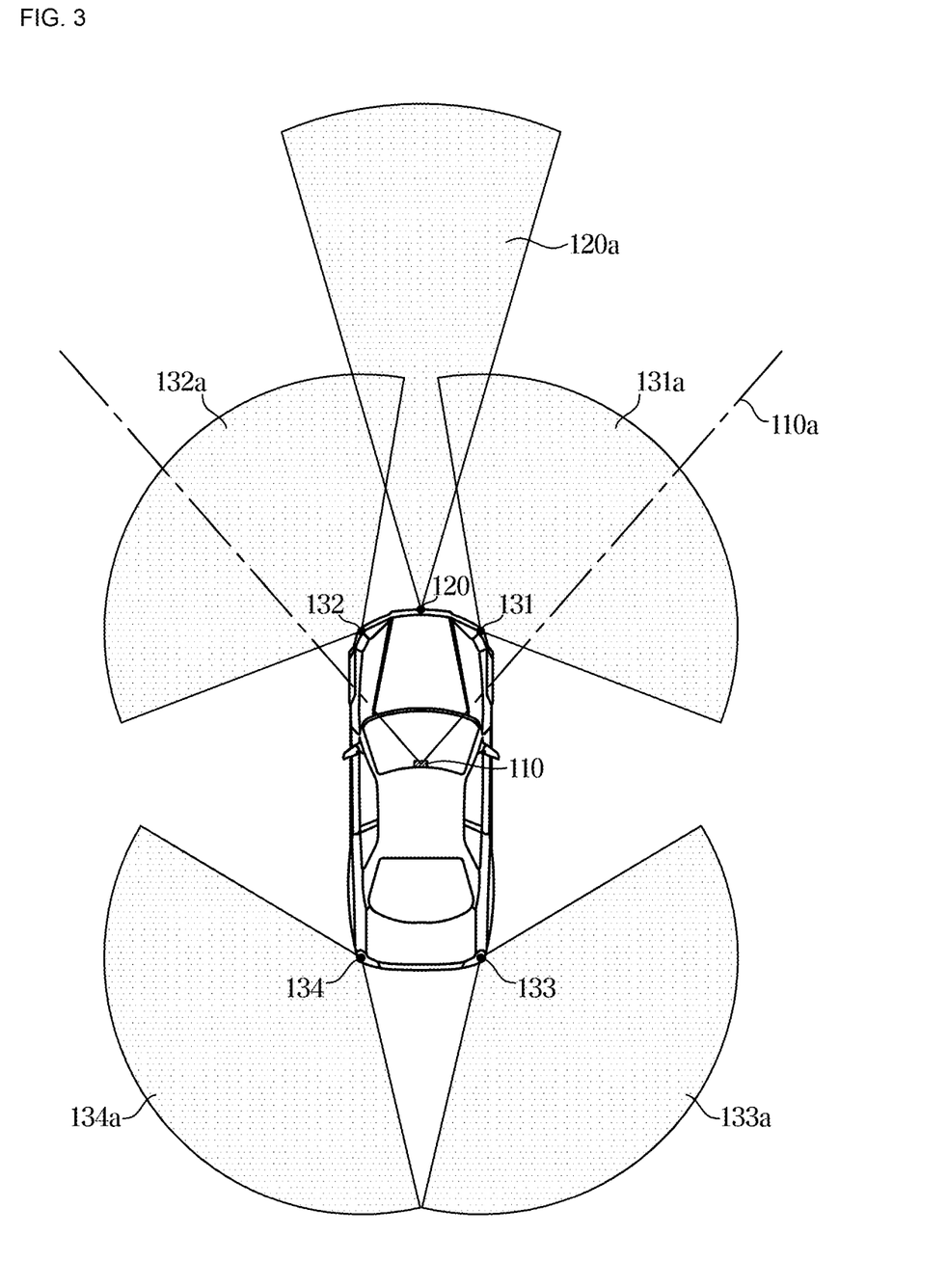
FIG. 3 is a diagram illustrating an example of a detection area of a camera and a radar included in an ADAS of a vehicle according to an embodiment.

FIG. 2 is a block diagram illustrating an ADAS provided in a vehicle according to an embodiment, and FIG. 3 is a diagram illustrating an example of a detection area of a camera and a radar included in an ADAS of a vehicle according to an embodiment.

Referring to FIG. 2, the vehicle 1 may include a braking system 32, a steering system 42, and a ADAS 100.

The braking system 32 according to the embodiment may include the EBCM (31 in FIG. 1) and the braking device (30 in FIG. 1) described in conjunction with FIG. 1, and the steering system 42 may include the EPS (41 in FIG. 1) and the steering device (40 in FIG. 1).

The ADAS 100 according to the embodiment may include a front camera 110, a front radar 120, and the plurality of corner radars 130.

As shown in FIG. 3, the front camera 110 may have a field of view 110a facing forward of the vehicle 1. The front camera 110 may be installed, for example, in the front windshield of the vehicle 1.

The front camera 110 may photograph the front of the vehicle 1 and acquire image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a controller 140. For example, the front camera 110 may be connected to the controller 140 through a vehicle communication network NT, through a hard wire, or through a printed circuit board (PCB).

The front camera 110 may transmit the image data of the front of the vehicle 1 to the controller 140.

The front radar 120 may have a field of sensing 120*a* facing the front of the vehicle 1. The front radar 120 may be installed, for example, on a grille or bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle. The front radar 120 may acquire front radar data from the transmission radio waves transmitted by the transmission antenna and the reflection radio waves received by the reception antenna. Front radar data may include position information and velocity information regarding an obstacle, such as another vehicle, a pedestrian, or a cyclist existing in front of the vehicle 1. The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

As shown in FIG. 3, the first corner radar 131 may have a field of sensing 131*a* directed to the front right side of the vehicle 1. The first corner radar 131 may be installed on the right side of a front bumper of the vehicle 1. The second corner radar 132 may have a field of sensing 132*a* directed to the front left side of the vehicle 1, and may be installed on the left side of the front bumper of the vehicle 1. The third corner radar 133 may have a field of sensing 133*a* directed to the rear right side of the vehicle 1 and may be installed on the right side of a rear bumper of the vehicle 1. The fourth corner radar 134 may have a field of sensing 134*a* directed to the rear left side of the vehicle 1 and may be installed on the left side of the rear bumper of the vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and velocity information regarding another vehicle, a pedestrian or a cyclist (hereinafter, referred to as "an obstacle") existing on the front right side of the vehicle 1. The second corner radar data may include distance information and velocity information regarding an obstacle existing on the front left side of the vehicle 1. The third and fourth corner radar data may respectively include distance and velocity information regarding an obstacle existing on the rear right side of the vehicle 1 and distance and velocity information regarding an object located on the rear left side of the vehicle 1, respectively.

Each of the first, second, third, and fourth corner radars 131, 132, 133 and 134 may be connected to the controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU (101*b* in FIG. 1) of the camera module (101 in FIG. 1) and/or the ECU (102*b* in FIG. 1) of the radar module (102 in FIG. 1), and/or an integrated ECU.

The controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42. For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect obstacles (e.g., another vehicle, a pedestrian, a cyclist, a curb, a guard rail, a roadside tree, a street lamp, and the like) in front of the vehicle 1 based on the front image data of the front camera 110 and the front radar data of the radar 120.

In detail, the processor 141 may acquire position information (distance and direction) and velocity information (relative velocity) of the obstacles in front of the vehicle 1 based on the front radar data of the front radar 120. The processor 141 may acquire position information (direction) and type information (for example, whether the obstacle is another vehicle, a pedestrian, a cyclist, a cub, a guard rail, a roadside tree, a street lamp, or the like) of the obstacle existing in front of the vehicle 1 based on the front image data of the front camera 110. In addition, the processor 141 may match the obstacles detected by the front image data with the obstacles detected by the front radar data, and acquire the type information, the position information, and the velocity information of the obstacles in front of the vehicle 1 based on a result of the matching.

The processor 141 may generate a braking signal and a steering signal based on the type information, the position information, and the velocity information of the front obstacles.

For example, the processor 141 calculates a time to collision (TTC) between the vehicle 1 and the front obstacle based on the position information (relative distance) and the velocity information (relative velocity) of the front objects, and warns the driver of a collision, transmits a braking signal to the braking system 32, or transmits a steering signal to the steering system 42 based on a result of comparing the TTC with a predetermined reference time. In response to the TTC less than a predetermined first reference time, the processor 141 may allow an alert to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) based on the velocity information (relative velocity) of front objects, and warn the driver of a collision or transmit a braking signal to the braking system 32 based on a result of comparing the DTC with distances to the front objects.

The processor 141 may acquire position information (distance and direction) and velocity information (relative velocity) of the obstacles on the sides of the vehicle 1 (front right, front left, rear right, and rear left) based on corner radar data of the plurality of corner radars 130.

The processor 141 may transmit a steering signal to the steering system 42 based on the location (distance and direction) and relative speed of lateral objects of the vehicle 1.

For example, when a collision with a front object is determined based on the time to collision or the distance to the collision, the processor 141 may transmit a steering signal to the steering system 42 to avoid collision with the front object.

The processor 141 may determine whether to avoid a collision with a front object by changing the driving direction of the vehicle 1 based on the location (distance and direction) and relative speed of the lateral objects of the vehicle 1. For example, when there is no object located on the side of the vehicle 1, the processor 141 may transmit a steering signal to the steering system 42 in order to avoid a collision with a front object. When the collision with the side object is not predicted after the steering of the vehicle 1 based on the position (distance and direction) and the relative speed of the side objects, the processor 141 may transmit a steering signal to the steering system 42 in order to avoid a collision with a front object. When a collision with a side object is predicted after steering of the vehicle 1 based on the position (distance and direction) of the side objects and the relative speed, the processor 141 may not transmit the steering signal to the steering system 42.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The ADAS 100 is not limited to that shown in FIG. 2, and may further include a lidar that scans around the vehicle 1 and detects an object.

As such, the controller 140 may transmit a braking signal to the braking system 32 based on whether a collision with a front object is predicted. When the side object does not exist or the collision with the side object is not predicted, the controller 140 may transmit a steering signal to the steering system 42 in order to avoid a collision with a front object. When a collision with a side object is predicted after steering, the controller 140 may not transmit a steering signal to the steering system 42.

Meanwhile, before describing various embodiments described below, data processed by the controller 140 and a subject of obtaining the data will be described.

A vehicle 1 includes a front image sensor having a front view of the vehicle 1 and acquiring front image data, a front non-image sensor that has a front detection field of view of the vehicle 1 and is selected from the group consisting of a radar sensor and a lidar sensor, and obtains front detection data, a lateral non-image sensor that has a lateral detection field of view of the vehicle 1 and is selected from a group consisting of a radar sensor and a lidar sensor to obtain lateral detection data, a rear image sensor that has a rear view of the vehicle 1 and acquires rear image data, and a rear non-image sensor that has a rear detection field of view of the vehicle 1 and is selected from a group consisting of a radar sensor and a lidar sensor to obtain rear detection data.

The front image sensor and the front non-image sensor may detect a front object located in front of the vehicle 1.

The lateral non-image sensor may detect a side object, a front side object, and a rear side object located in the side, front side and rear side of the vehicle 1. The lateral non-image sensor is installed at a corner position of the vehicle 1 and can detect lateral objects, anterior objects, and rear objects located in the lateral, front and rear sides alone, and may be installed on the side of the vehicle 1, together with the front image sensor, the front non-image sensor, the rear image sensor and the rear non-image sensor and detects lateral objects, anterior and posterior objects located in the anterior and posterior areas.

The rear image sensor and the rear non-image sensor may detect a rear object located at the rear of the vehicle 1.

In addition, the disclosed invention is carried out based on the on/off of the turn indicator lamp of the vehicle 1 when the adaptive cruise control (ACC) is activated. For example, when the direction indicator lamp of the vehicle 1 is turned on, the controller 140 may determine that the driver is willing to change lanes, and a control algorithm to be described later may be executed. For example, when the left side of the direction indicator lamp is turned on, the controller 140 predicts that the driver will attempt to change lanes to the left lane, and performs control based on the activation of the non-image sensor on the left. Conversely, when the right side of the direction indicator lamp is turned on, the controller 140 predicts that the driver will attempt to change the lane to the right lane, and performs control based on the activation of the non-image sensor on the right.

Figure 4:
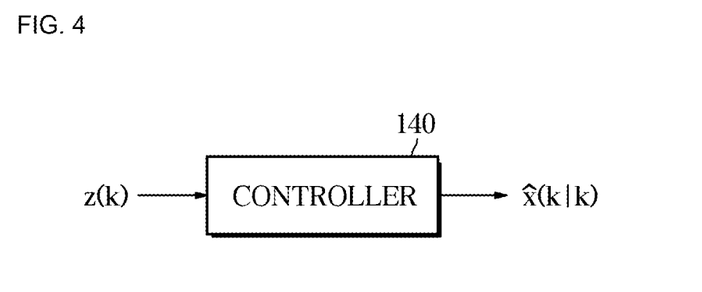
FIG. 4 is a diagram illustrating input data and output data of a controller according to an embodiment.
Figure 5:
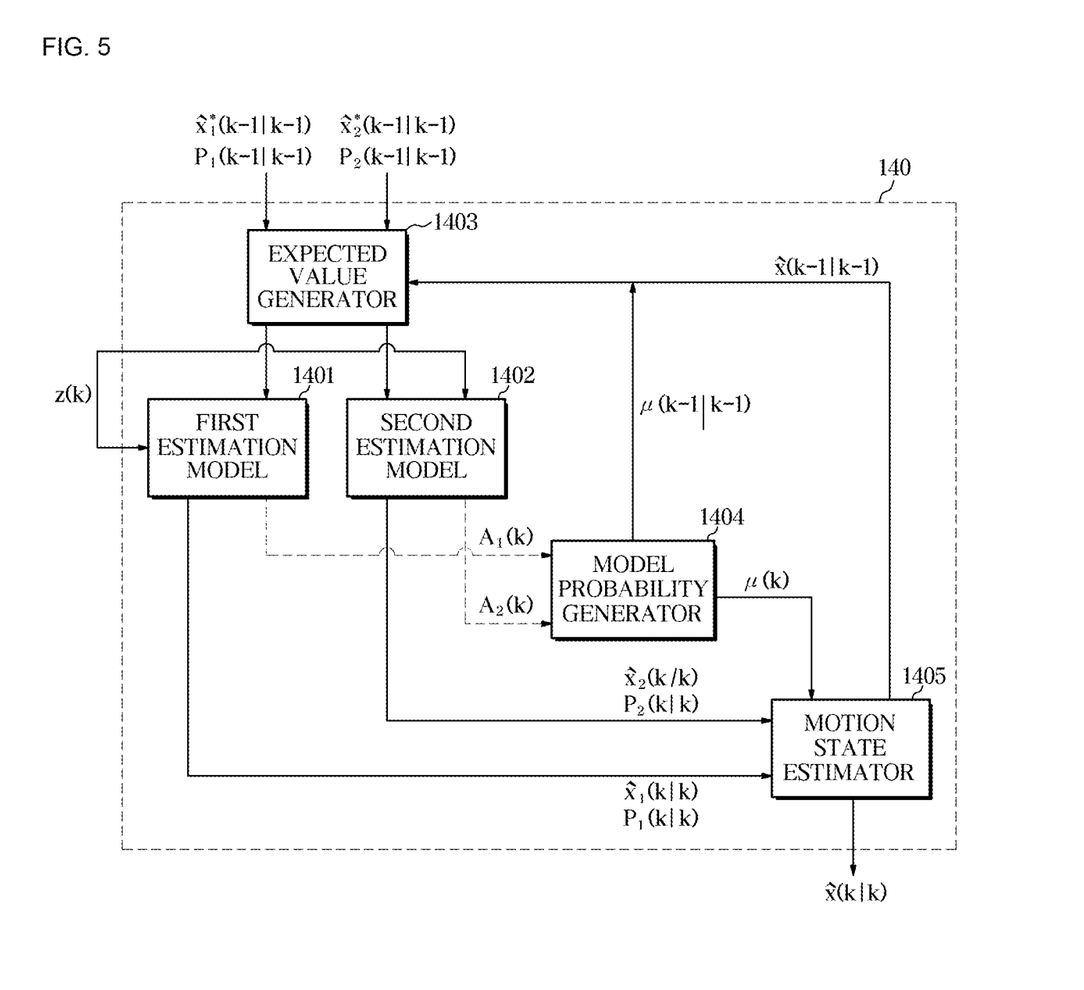
FIG. 5 is a diagram illustrating a detailed configuration of a controller according to an embodiment.
Figure 6:
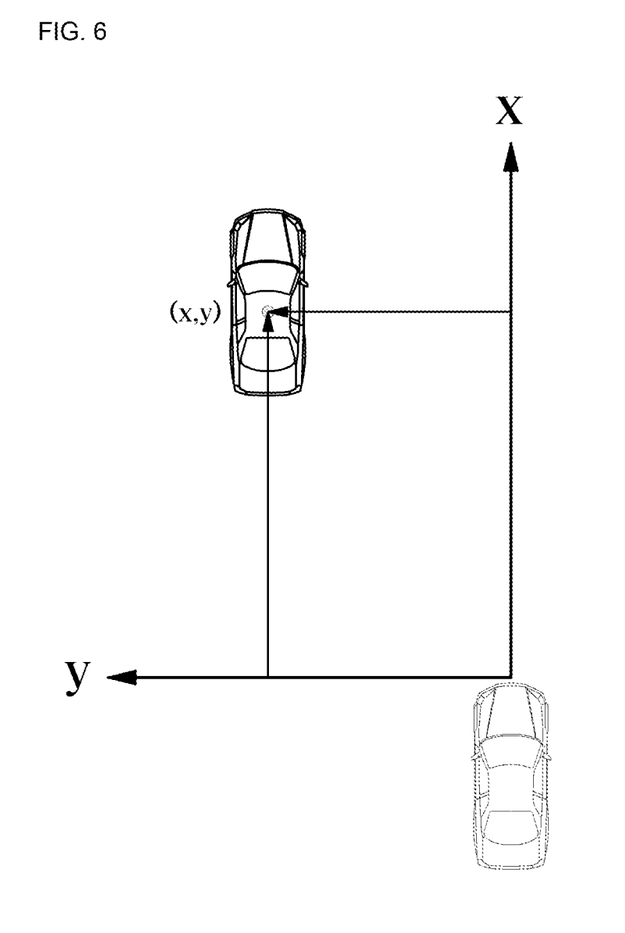
FIG. 6 is a flowchart of a driver assistance method according to an embodiment.
Figure 7:
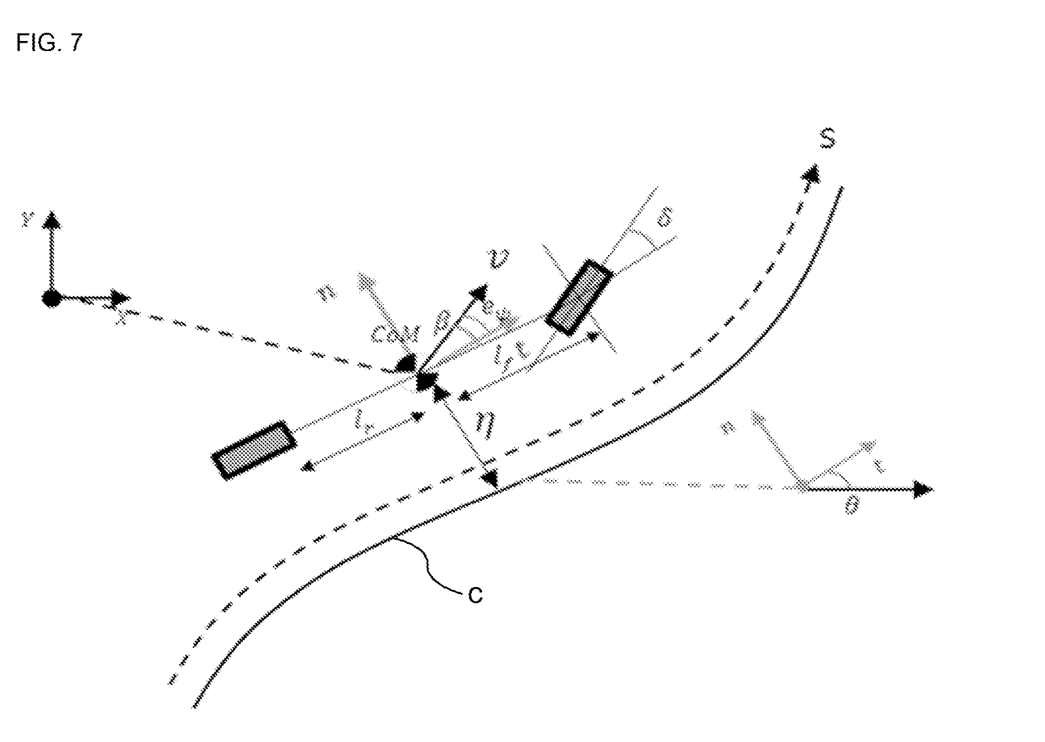
FIG. 7 is a diagram for describing a first estimation model referenced in an embodiment.
Figure 8:
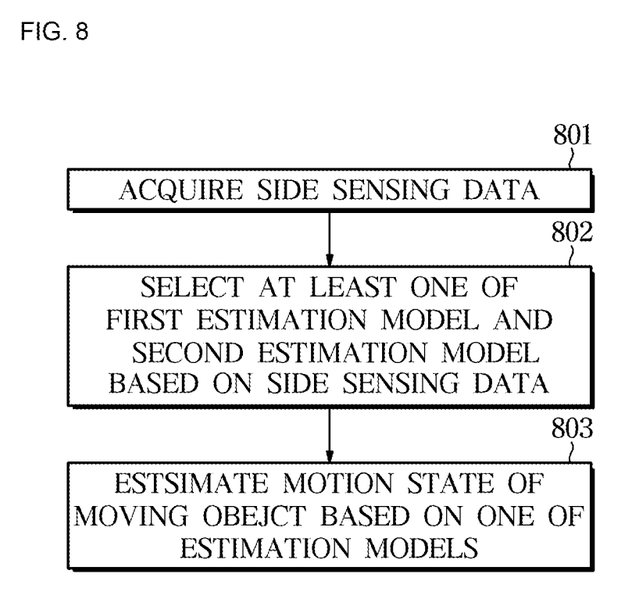
FIG. 8 is a diagram for describing a second estimation model referenced in an embodiment.

FIG. 4 is a diagram illustrating input data and output data of a controller according to an embodiment. FIG. 5 is a diagram illustrating a detailed configuration of a controller according to an embodiment. FIG. 6 is a flowchart of a driver assistance method according to an embodiment. FIG. 7 is a diagram for describing a first estimation model referenced in an embodiment. FIG. 8 is a diagram for describing a second estimation model referenced in an embodiment.

The controller 140 uses side sensing data ($z(k)$) acquired from the radar sensor as input data, and estimates the motion state ($\tilde{x}(k|k)$) of the moving object, which is output data generated based on at least one of a first estimation model or a second estimation model to be described later.

Specifically, the controller 140 includes a first estimation model 1401, a second estimation model 1402, an expected value generator 1403, a model probability generator 1404, and a motion state estimator 1405.

The first estimation model 1401 is a model for estimating the motion state of the moving object on the premise that the moving object is a moving object at an equal acceleration speed. Specifically, the first estimation model 1401 is based on the center of mass of the moving object, sets coordinates based on the vehicle 1, and may estimate a motion state of the moving object over time based on the lateral and vertical positions of the moving object, the lateral and vertical speeds of the moving object, and the lateral and vertical accelerations of the moving object. For example, referring to FIG. 6, the first estimation model may predict the motion state of the moving object by Equation 1 below.

$$X(k+1) = AX(k) + Bw(k) \quad \text{[Equation 1]}$$

$$\text{Here, } A = \begin{bmatrix} 1 & \Delta T & \Delta T^2/2 & 0 & 0 & 0 \\ 0 & 1 & \Delta T & 0 & 0 & 0 \\ 0 & 0 & 1 & 0 & 0 & 0 \\ 0 & 0 & 0 & 1 & \Delta T & \Delta T^2/2 \\ 0 & 0 & 0 & 0 & 1 & \Delta T \\ 0 & 0 & 0 & 0 & 0 & 1 \end{bmatrix},$$

$$B = \begin{bmatrix} \Delta T^2/2 & 0 \\ \Delta T & 0 \\ 1 & 0 \\ 0 & \Delta T^2/2 \\ 0 & \Delta T \\ 0 & 1 \end{bmatrix}, X = \begin{bmatrix} x \\ v_x \\ a_x \\ y \\ v_y \\ a_y \end{bmatrix}$$

The second estimation model 1402 assumes that the moving object is not a constant acceleration motion. Specifically, the second estimation model 1402 estimates the motion state of the moving object by applying a bicycle model to the Frenet frame on the premise that the moving object performs a steering operation (generating a lateral force). Accordingly, the second estimation model 1402 can analyze the moving object reflecting fine understeer or oversteer as a result of considering the steering operation of the moving object.

For example, referring to FIG. 7, the second estimation model 1402 may predict a motion state of a moving object by Equation 2 below.

$$x_{k+1} = \begin{bmatrix} s_{k+1} \\ \eta_{k+1} \\ e_{\psi_{k+1}} \\ v_{k+1} \end{bmatrix} = \begin{bmatrix} s_k + T_s \bar{s}_k \\ \eta_k + T_s v_k \sin(e_\psi) \\ e_{\psi_k} + T_s\left(\beta_k + \frac{v_k}{l_r}\sin(\beta_k) - \kappa(s)\bar{s}_k\right) \\ v_k + T_s a_k \end{bmatrix} \quad \text{[Equation 2]}$$

(Here, $$\beta_k = \tan^{-1}\left(\frac{l_r}{l_f + l_r}\tan(\gamma_k)\right),$$

s: Length of the curve, η: lateral error from the centerline, κ(s): curvature of the centerline in the lane; $e_\psi$: difference between the moving object's travel direction angle (δ) and the moving object's slip angle (β), CoM: Center of Mass, $l_f$: Distance between CoM and front wheel, $l_r$: Distance between and rear wheel).

The disclosed invention may estimate a motion state of a moving object based on either the first estimation model 1401 or the second estimation model 1402 in consideration of the driving state and the road condition of the moving object. A specific method of selecting an estimation model will be described later.

For example, the controller 140 may estimate the motion state of the moving object based on the first estimation model 1401 when the driving state of the moving object is not predicted to be curved or straight. This is because the steering operation of the moving object generates a lateral force, which is because relatively large noise is generated in the lateral direction measurement of the moving object. Conversely, the controller 140 may estimate the moving state based on the second estimation model 1402 when the moving state of the moving object is close to the straight traveling or straight traveling. In this case, the controller 140 can accurately estimate the motion state of the moving object even with a small movement of the moving object. In addition, unlike the first estimation model 1401, the second estimation model 1402 uses the location of the moving object, the speed of the moving object, and the acceleration of the moving object, the curvature of the lane in which the moving object travels, the center line of the lane, and the angle error information of the moving direction of the moving object, it is possible to more accurately estimate the motion state of a moving object in situations such as straight driving and low speed driving.

Meanwhile, the controller 140 may select one of the first estimation model 1401 or the second estimation model 1402 based on the side sensing data acquired by the radar sensor of the vehicle 1. Here, the side sensing data includes information about the position of the moving object, the speed of the moving object, and the acceleration of the moving object.

In addition, based on the first estimation model 1401 and the second estimation model 1402 designed based on the Kalman filter, the controller 140 may determine which estimation model is more suitable as a result of probabilistically combining the results of the motion states of each moving object, and estimate the motion state of the moving object based on the suitable model.

Meanwhile, in the above, the first estimation model 1401 and the second estimation model 1402 have been described in detail. Hereinafter, a selection method between the first estimation model 1401 and the second estimation model 1402 based on an interactive multiple model will be described in detail.

The controller 140 includes an expected value generator 1403 that calculates an expected value of a motion state of the moving object based on a previous motion state estimation value and a coupling probability of the moving object. Specifically, the expected value generator 1403 may calculate an expected value of a motion state of a moving object applied to the first and second estimation models 1401 and 1402 based on the moving object's previous position and the moving object's previous velocity and the coupling probability.

For example, the controller 140 may calculate an expected value of the motion state of the moving object based on Equation 3 below.

$$\hat{x}_j = \sum_{i=1}^{M} \hat{x}_i(k-1 \mid k-1) * \mu_{i|j}(k-1 \mid k-1) \quad \text{[Equation 3]}$$

Here, $\hat{x}_j$ is the expected value of the motion state of the moving object, $\hat{x}_i$ is the estimated value of the previous motion state of the moving object, and $\mu_{i|j}$ is the coupling probability between the first and second estimation models.

In this case, the controller 140 may calculate a coupling probability based on Equation 4 below.

$$\mu_{i|j}(k-1 \mid k-1) = \frac{1}{\bar{c}_j} p_{ij}\mu_i(k-1) \qquad \text{[Equation 4]}$$

Here, $\mu_{i|j}$ is the coupling probability between the first and second estimation models, $c_j$ is the normalization coefficient, $\bar{c}_j = \Sigma_{i=1}^{M} p_{ij}\mu_j(k-1)$, $p_{ij}$ is the model transition probability: $p_{ij} = \text{Prob}\{I(\theta_k) = j | I(\theta_{k-1}) = i\}$.

Meanwhile, the controller 140 generates a likelihood function to estimate the motion state of the final moving object. The likelihood function may be generated by Equation 5 below.

$$\Lambda_j(k) = \frac{1}{\sqrt{2\pi|S_j(k)|}} \exp\left(-\frac{E_j(k)S_j(k)^{-1}E_j(k)^T}{2}\right) \qquad \text{[Equation 5]}$$

Here, $\Lambda_j(k)$ is a likelihood function, $s_j(k)$ is an error covariance between measurement model and measurement value $(s_j(k) = H_j P_j(k|k-1) H_j^T + R_j(k))$, $E_j(k)$ is an error between the estimate from the measurement model and the actual measurement $(E_j(k) = z(k)) - \hat{z}_j(k|k-1))$, $H_j$: measurement model, $P_j(k|k-1)$: system error covariance, $R_j(k)$: measurement noise)

The controller 140 includes a model probability generator 1404 that generates a model probability, and calculates a model probability selected from among the first estimation model 1401 and the second estimation model 1402 as the final model for estimating the motion state of the final moving object. Specifically, the controller 140 determines which estimation model is to be selected based on the likelihood function generated by the first estimation model 1401 and the second estimation model 1402, and determines the final motion state of the moving object and refers to equation 6 below.

$$\mu_j(k) = \frac{\Lambda_j(k)\bar{c}_j}{\sum_{i=1}^{M}\Lambda_j(k)\bar{c}_j} \qquad \text{[Equation 6]}$$

Here, $\bar{c}_j$ is the normalization coefficient, $\bar{c}_j = \Sigma_{i=1}^{M} p_{ij}\mu_j(k-1)$, and $\Lambda_j(k)$ is a likelihood function.

The controller 140 includes a motion state estimator 1405 for estimating the motion state of the final moving object, and outputs a final motion state of the moving object based on the model probability generated by Equation 6 above. This can be calculated by Equation 7 below.

$$\hat{X}(k \mid k) = \sum_{i=1}^{M} \hat{X}_j(k \mid k)\mu_j(k) \qquad \text{[Equation 7]}$$

Here, $\mu_j(k)$ is a model probability, $\hat{X}_j(k|k)$ is an expected value of moving object.

The finally calculated motion state of the moving object is determined whether the first estimation model 1401 or the second estimation model 1402 is suitable for the motion state of the future moving object based on the characteristics of probabilistic regression between the previous motion state of the moving object and the current motion state of the moving object. The motion state of the moving object is derived by either the first estimation model 1401 or the second estimation model 1402.

FIG. 8 is a flowchart of a driver assistance method according to an exemplary embodiment. This is merely a preferred embodiment for achieving the object of the present disclosure, and of course, some steps may be added or deleted as necessary.

The controller 140 acquires side sensing data through a radar sensor provided in the vehicle 1 (801). In this case, it goes without saying that the side sensing data may be acquired by various sensors such as a lidar sensor in addition to acquiring through a radar sensor.

The controller 140 selects one of the first estimation model and the second estimation model based on the side sensing data (802). The method of selecting the estimation model is as described above.

The controller 140 estimates the motion state of the moving object based on the selected one estimation model (803). Accordingly, the vehicle 1 can implement various systems based on the estimated motion state of the moving object. For example, controller 140 may perform Lane Departure Warning (LDW) based on the estimated motion state of the moving object, Lane Keeping Assist (LKA), High Beam Assist (HBA), Autonomous Emergency Braking (AEB), Traffic Sign Recognition (TSR), Smart Cruise Control (SCC) and Blind Spot Detection (BSD), etc.

Meanwhile, the disclosed embodiments may be implemented in the form of a recording medium storing instructions executable by a computer. The instruction may be stored in the form of a program code, and when executed by a processor, a program module may be generated to perform the operation of the disclosed embodiments. The recording medium may be implemented as a computer-readable recording medium.

Computer-readable recording media include all kinds of recording media in which instructions that can be read by a computer are stored. For example, there may be read only memory (ROM), random access memory (RAM), magnetic tape, magnetic disk, flash memory, optical data storage device, and the like.

As described above, the disclosed embodiments have been described with reference to the accompanying drawings. Those of ordinary skill in the art to which the present disclosure pertains will understand that the present disclosure may be implemented in a form different from the disclosed embodiments without changing the technical spirit or essential features of the present disclosure. The disclosed embodiments are illustrative and should not be construed as limiting.

According to an aspect of the disclosure, it is possible to accurately estimate a motion state of a moving object in an irregular driving state.

What is claimed is:

1. A driver assistance system, comprising:
 a radar sensor installed in a vehicle, having a side sensing field of view of the vehicle, and configured to acquire side sensing data; and
 a controller including a processor configured to process the side sensing data,
 wherein the controller is configured to apply the side sensing data to at least one estimation model of a first estimation model and a second estimation model and estimate a motion state of a moving object at a side of the vehicle based on the applying the side sensing data to the at least one estimation model, wherein the controller is configured to:

generate an expected value of the motion state of the moving object based on a sum of products of estimated values of previous motion states of the moving object and coupling probabilities between the first and second estimation models, and estimate the motion state of the moving object based on the expected value of the motion state of the moving object.

2. The driver assistance system of claim 1, wherein the controller is configured to estimate the motion state of the moving object based on at least one of the first estimation model that calculates on a premise that a lateral motion and a longitudinal motion of the moving object are an equivalent acceleration motion, and the second estimation model that calculates on the premise that the moving object is in a curved motion.

3. The driver assistance system of claim 1, wherein the first estimation model is configured to estimate the motion state of the moving object based on a position of the moving object, a speed of the moving object, and an acceleration of the moving object.

4. The driver assistance system of claim 1, wherein the second estimation model is configured to estimate the motion state of the moving object based on a position of the moving object, a speed of the moving object, an acceleration of the moving object, curvature of a lane on which the moving object travels, a center line of the lane, and error information of a traveling direction angle of the moving object.

5. The driver assistance system of claim 4, wherein the second estimation model is configured to estimate the motion state of the moving object by applying the side sensing data of the moving object to a Frenet frame.

6. The driver assistance system of claim 1, wherein the controller is configured to calculate the expected value of the motion state of the moving object based on Equation 3 below, $$\hat{x}_j = \sum_{i=1}^{M} \hat{x}_i(k-1 \mid k-1) * \mu_{i|j}(k-1 \mid k-1) \quad \text{[Equation 3]}$$

here, $\hat{x}_j$ is the expected value of the motion state of the moving object, $\hat{x}_i$ is an estimated value of a previous motion state of the moving object, and $\mu_{i|j}$ is a coupling probability between the first and second estimation models.

7. The driver assistance system of claim 6, wherein the controller is configured to calculate the coupling probability based on Equation 4 below, $$\mu_{i|j}(k-1 \mid k-1) = \frac{1}{\bar{c}_j} p_{ij}\mu_i(k-1) \quad \text{[Equation 4]}$$

here, $\mu_{i|j}$ is the coupling probability between the first and second estimation models, $\bar{c}_j$ is a normalization coefficient, $\bar{c}_j=\Sigma_{i=1}^{M}p_{ij}\mu_i(k-1)$, $p_{ij}$ is a model transition probability, $p_{ij}=\text{Prob}\{I(\theta_k)=j|I(\theta_{k-1})=i\}$.

8. The driver assistance system of claim 7, wherein controller is configured to generate a likelihood function based on equation 5 below, $$\Lambda_j(k) = \frac{1}{\sqrt{2\pi|S_j(k)|}} \exp\left(-\frac{E_j(k)S_j(k)^{-1}E_j(k)^T}{2}\right) \quad \text{[Equation 5]}$$

here, $\Lambda_j(k)$ is the likelihood function, $S_j(k)$ is an error covariance between a measurement model and a measurement value ($S_j(k)=H_jP_j(k|k-1)H_j^T+R_j(k)$), $E_j(k)$ is an error between an estimate from the measurement model and an actual measurement ($E_j(k)=z(k)-\hat{z}_j(k|k-1)$).

9. The driver assistance system of claim 6, wherein the controller is configured to calculate a model probability selected from the first estimation model and the second estimation model based on Equation 6 below, $$\mu_j(k) = \frac{\Lambda_j(k)\bar{c}_j}{\sum_{i=1}^{M}\Lambda_j(k)\bar{c}_j} \quad \text{[Equation 6]}$$

here, $\bar{c}_j$ is a normalization coefficient, $\bar{c}_j=\Sigma_{i=1}^{M}p_{ij}\mu_i(k-1)$, and $\Lambda_j(k)$ is a likelihood function.

10. The driver assistance system of claim 7, wherein the controller is configured to estimate the motion state of the moving object based on a model probability according to Equation 7 below, $$\hat{X}(k \mid k) = \sum_{i=1}^{M} \hat{X}_j(k \mid k)\mu_j(k) \quad \text{[Equation 7]}$$

here, $\mu_j(k)$ is the model probability, $\hat{X}_j(k|k)$ is the expected value of the motion state of the moving object.

11. A method for driver assistance of a vehicle, comprising:

providing at least one radar sensor having a side sensing field of view to the vehicle;

acquiring, by a processor, side sensing data from the at least one radar sensor;

applying, by the processor, the side sensing data to at least one estimation model of a first estimation model and a second estimation model; and estimating, by the processor, a motion state of a moving object at a side of the vehicle based on the applying of the side sensing data to the at least one estimation model, wherein the estimating of the motion state of the moving object includes:

generating, by the processor, an expected value of the motion state of the moving object based on a sum of products of estimated values of previous motion states of the moving object and coupling probabilities between the first and second estimation models, estimating, by the processor, the motion state of the moving object based on the expected value of the motion state of the moving object, and controlling the vehicle based on a result of the estimating of the motion state of the moving object.

12. The method of claim 11, wherein the estimating of the motion state of the moving object includes estimating the motion state of the moving object based on at least one of the first estimation model that calculates on a premise that a lateral motion and a longitudinal motion of the moving object are an equivalent acceleration motion, and the second estimation model that calculates on the premise that the moving object is in a curved motion.

13. The method of claim 11, wherein the first estimation model is configured to estimate the motion state of the moving object based on a position of the moving object, a speed of the moving object, and an acceleration of the moving object.

14. The method of claim 11, wherein the second estimation model is configured to estimate the motion state of the moving object based on a position of the moving object, a speed of the moving object, an acceleration of the moving object, curvature of a lane on which the moving object travels, a center line of the lane, and error information of a traveling direction angle of the moving object.

15. The method of claim 14, wherein the second estimation model is configured to estimate the motion state of the moving object by applying the side sensing data of the moving object to a Frenet frame.

16. The method of claim 11, wherein the estimating of the motion state of the moving object includes calculating the expected value of the motion state of the moving object based on Equation 3 below, $$\hat{x}_j = \sum_{i=1}^{M} \hat{x}_i(k-1 \mid k-1) * \mu_{i|j}(k-1 \mid k-1) \quad \text{[Equation 3]}$$

here, $\hat{x}_j$ is the expected value of the motion state of the moving object, $\hat{x}_i$ is an estimated value of a previous motion state of the moving object, and $\mu_{i|j}$ is a coupling probability between the first and second estimation models.

17. The method of claim 16, wherein the estimating of the motion state of the moving object includes calculating the coupling probability based on Equation 4 below, $$\mu_{i|j}(k-1 \mid k-1) = \frac{1}{\bar{c}_j} p_{ij}\mu_i(k-1) \quad \text{[Equation 4]}$$

here, $\mu_{i|j}$ is the coupling probability between the first and second estimation models, $c_j$ is a normalization coefficient, $\bar{c}_j = \Sigma_{i=1}^{M} p_{ij}\mu_i(k-1)$, $p_{ij}$ is a model transition probability, $p_{ij} = \text{Prob}\{I(\theta_k)=j \mid I(\theta_{k-1})=i\}$.

18. The method of claim 17, wherein the estimating of the motion state of the moving object includes generating a likelihood function based on equation 5 below, $$\Lambda_j(k) = \frac{1}{\sqrt{2\pi|S_j(k)|}} \exp\left(-\frac{E_j(k)S_j(k)^{-1}E_j(k)^T}{2}\right) \quad \text{[Equation 5]}$$

here, $\Lambda_j(k)$ is the likelihood function, $S_j(k)$ is an error covariance between a measurement model and a measurement value, $E_j(k)$ is an error between an estimate from the measurement model and an actual measurement.

19. The method of claim 11, wherein the estimating of the motion state of the moving object includes calculating a model probability selected from the first estimation model and the second estimation model based on Equation 6 below, $$\mu_j(k) = \frac{\Lambda_j(k)\bar{c}_j}{\sum_{i=1}^{M} \Lambda_j(k)\bar{c}_j} \quad \text{[Equation 6]}$$

here, $\bar{c}_j$ is a normalization coefficient, $\bar{c}_j = \Sigma_{l=1}^{M} p_{ij}\mu_i(k-1)$, and $\Lambda_j(k)$ is a likelihood function.

20. The method of claim 17, wherein the estimating of the motion state of the moving object includes estimating the motion state of the moving object based on a model probability according to Equation 7 below, $$\hat{X}(k \mid k) = \sum_{i=1}^{M} \hat{X}_j(k \mid k)\mu_j(k) \quad \text{[Equation 7]}$$

here, $\mu_j(k)$ is the model probability, $\hat{X}_j(k|k)$ is the expected value of the motion state of the moving object.

* * * * *